No. 685,150. Patented Oct. 22, 1901.
J. A. KEYES.
CYCLOMETER.
(Application filed Feb. 26, 1900.)
(No Model.) 3 Sheets—Sheet 1.
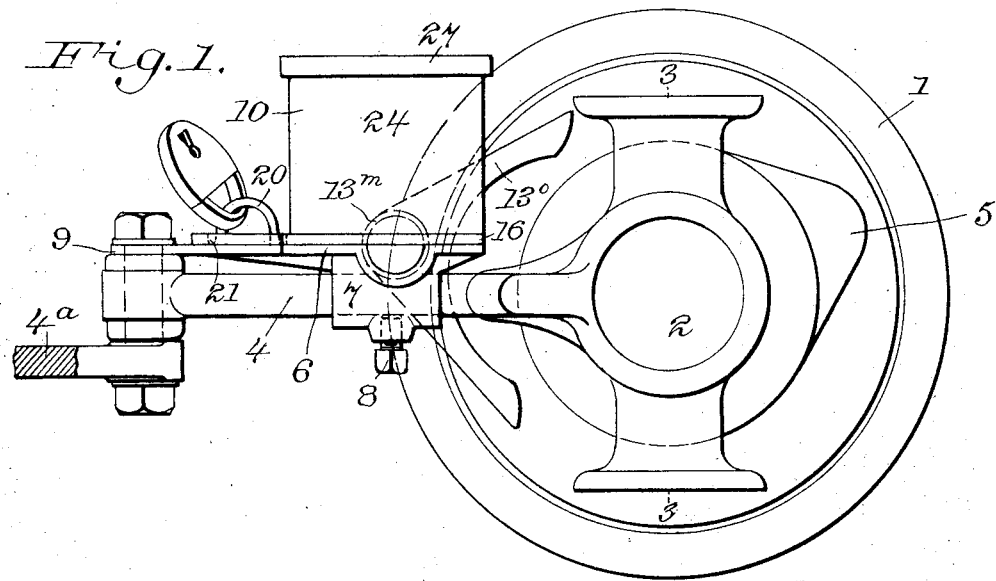
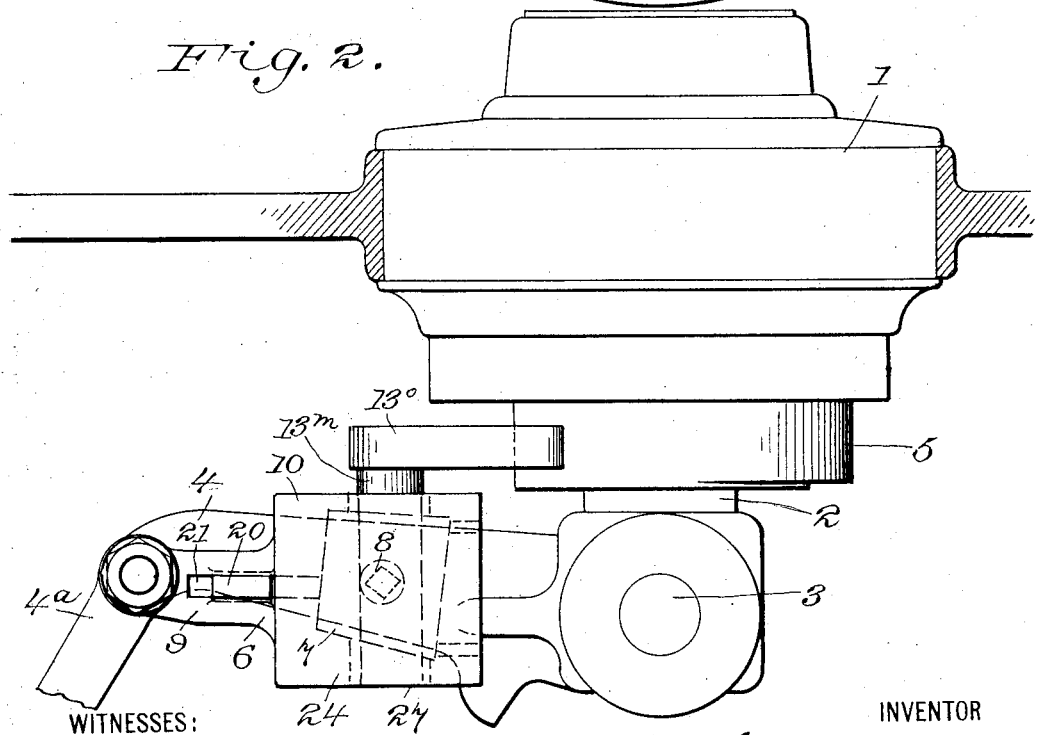
INVENTOR
James A. Keyes.
BY
Frankland James
ATTORNEY
WITNESSES:
W. H. Humphrey.

No. 685,150. Patented Oct. 22, 1901.
J. A. KEYES.
CYCLOMETER.
(Application filed Feb. 26, 1900.)
(No Model.) 3 Sheets—Sheet 2.

WITNESSES:

INVENTOR
James A. Keyes,
BY
Frankland James
ATTORNEY

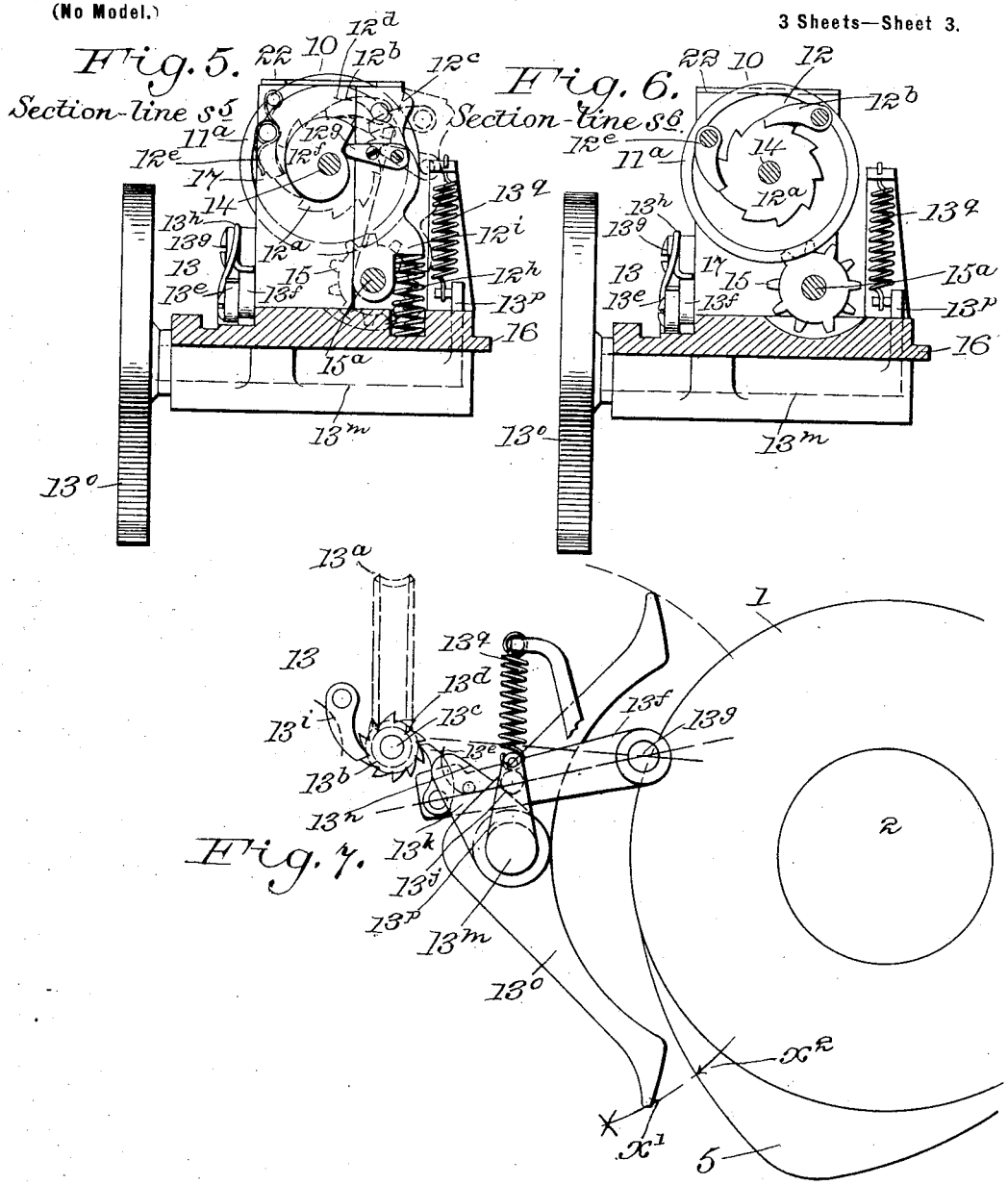

UNITED STATES PATENT OFFICE.

JAMES A. KEYES, OF NEW YORK, N. Y.

CYCLOMETER.

SPECIFICATION forming part of Letters Patent No. 685,150, dated October 22, 1901.

Application filed February 26, 1900. Serial No. 6,462. (No model.)

*To all whom it may concern:*

Be it known that I, JAMES A. KEYES, a citizen of the United States of America, and a resident of New York, county of New York, State of New York, (post-office address at No. 656 Hudson street, New York, N. Y.,) have invented certain new and useful Improvements in Cyclometers, (Case C,) of which the following is a specification.

My invention relates generally to cyclometers. As indicated, the cyclometer is used in connection with and applied to the steering-gear of the larger power-driven vehicles of the auto or loco mobile class.

The novelty of the invention lies in the construction and relation of parts, as will appear.

The invention is illustrated in the accompanying drawings.

Figure 3:
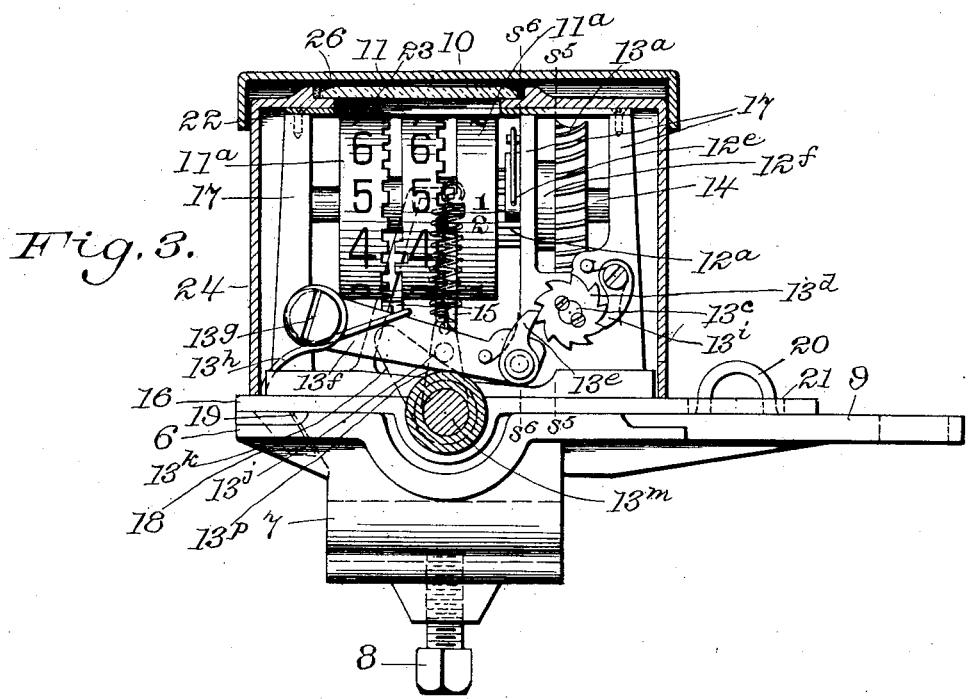
Figure 4:
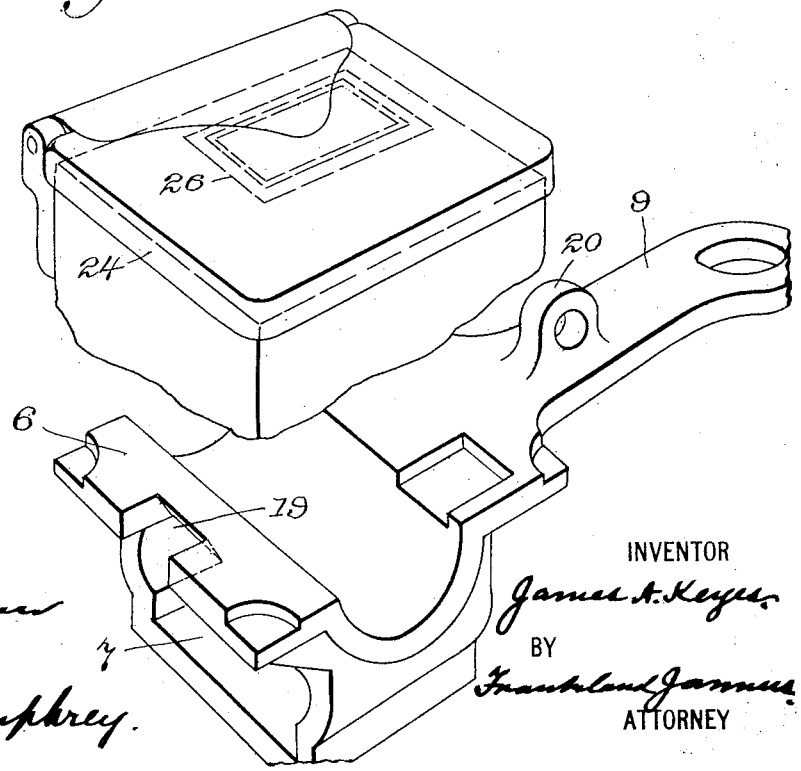

Figure 1 is a view in elevation of one of the wheel-hubs and a member of the steering-gear connected therewith, showing the application of the cyclometer. Fig. 2 is a plan view of the same. Fig. 3 is a view showing the cyclometer mechanism in elevation and the upper cap or casing thereof in section. Fig. 4 is a view in perspective of the detachable base and the upper portion of the cap or casing. Fig. 5 is a sectional view taken on the line $s^5\ s^5$ of Fig. 3 and showing the cyclometer removed from its base and casing. Fig. 6 is a similar view taken on the line $s^6\ s^6$ of Fig. 3. Fig. 7 is a view in diagram illustrating the operation of the double-acting cam and the self-centering yoke, also the relation of other parts of the gearing which connect the ratchet-feed with the vehicle.

In the drawings, 1 represents the hub of a vehicle-wheel. In this instance the steering-wheel hub of a power-driven vehicle is shown of the auto or loco mobile class.

2 represents the axle, and 3 the pivotal axis about which the wheel and its axle or spindle 2 are adjustable under the control of suitable steering mechanism, which is extended from the pivotal axis of the steering-wheel through suitable connections, two members 4 and $4^a$ of which are shown.

4 indicates a short arm rigidly connected with the steering-wheel spindle 2, while $4^a$ is a part of one of the connections pivotally attached to the outer extremity thereof and whereby the arm and spindle are manipulated to move the steering-wheel and control the vehicle.

5 represents a cam or stud mounted upon and rotating with the hub 1.

As indicated in Figs. 1, 2, 3, and 4, 6 represents a base-plate to which the cyclometer is designed to be detachably secured. This plate when used is provided with a sleeve or collar 7, which is adapted to encircle the arm 4 of the steering-gear; also, with a set-screw 8, by which the base is clamped in position thereon. Thus secured the base becomes practically a fixture and serves at all times to provide a seat for mounting a readily-detachable cyclometer. As an additional fastening the base-plate is extended at 9 and apertured for engagement with the bolt securing the arm 4 to the connecting member of the steering-gear.

10 represents the cyclometer, which comprises a registering mechanism 11, a ratchet-feed device 12, and gearing 13, connecting the feed with the vehicle-wheel. The register 11 may be of any suitable or well-known form and employ any number of indicating drums or wheels $11^a$. In the present instance, however, three wheels are shown loosely mounted upon a through-shaft 14. The wheel to the right is peripherally marked at four equispaced points with "$\frac{1}{2}$," "1," "$1\frac{1}{2}$," and "2" and designed to register half-miles. The central or intermediate wheel is peripherally marked from "1" to "10," inclusive, and serves to register units—*i. e.*, miles. The wheel to the left of the series is also marked from "1" to "10," inclusive, and registers tens. The adjoining edges of the rims of these wheels are suitably notched and through coinciding notches are operatively connected by transfer-gearing 15 in a well-known manner to indicate addition from zero up to one hundred miles.

The feed for the register comprises a ratchet-wheel $12^a$, which is keyed or otherwise fixed to rotate with the register-wheel to the right of the series. The ratchet is advanced step by step through a pawl $12^b$, carried by a rocker-arm $12^c$, which latter is mounted loosely upon the shaft $15^a$, carrying the transfer-gearing of the register. The feed-pawl is sustained in operative relation to the ratchet by a spring $12^d$, and back play of the ratchet is prevented by the locking-pawl $12^e$. The rocker-arm is oscillated by a cam $12^f$, loosely mounted upon shaft 14 and acting upon a fixed stud or projection $12^g$ thereof, and is retracted by means of a spring $12^h$ acting against a projecting heel $12^i$ thereof, as is best shown in Fig. 5.

The gearing connecting the ratchet-feed with the vehicle comprises the worm-gear $13^a$, which is loose on shaft 14 and is keyed or otherwise secured to cam $12^f$, so that the gear and cam rotate together. The gear $13^a$ meshes with and is driven by a worm $13^b$, fixed on and rotating with shaft $13^c$, which latter has also mounted upon its outer end a ratchet $13^d$. This ratchet is advanced by a spring-pressed pawl $13^e$, carried by an arm $13^f$, which is pivoted at $13^g$ and sustained normally in a retracted position by a spring $13^h$. Back play of the ratchet is prevented by a spring-pressed locking-pawl $13^i$, which engages it continuously and limits its movement to rotation in one direction. The arm $13^f$ is provided with a projection and stud $13^j$ and is elevated against the action of its spring by a cam $13^k$ to cause the dog to advance the ratchet. The cam $13^k$ consists, essentially, of a short arm upon shaft $13^m$, upon the edge of which the stud or projection $13^j$ travels when the cyclometer is registering. Upon the outer end of the cam-shaft $13^m$ an approximately V-shaped yoke $13^o$ is fixed, and is adapted to be engaged by a cam 5 upon the hub of the vehicle, which serves to oscillate the same during either the forward or backward travel of the vehicle. A short arm $13^p$ is also attached to the cam-shaft and is engaged by a spring $13^q$, which operates to hold the cam-shaft and the yoke in normal position—that is, out of contact with the hub when not operatively engaged by the cam thereon. The movement of the yoke in oscillation is just sufficient to permit the passage and clearance of the hub-cam, and thereby renders attempted adjustment, shifting, or jamming to any other than an operative position impossible without breaking the same.

Referring to Fig. 7, the yoke is shown in its central position. During the travel of the vehicle either forward or backward the yoke oscillates in the arc X between points $x'$ $x^2$. This movement of the yoke is effected by the action of the cam or projection above referred to.

The mechanism of the cyclometer above described is mounted upon a plate 16, from which a series of uprights 17 17 17 rise to provide bearings for the several shafts mentioned. This plate conforms substantially in outline to the upper surface of the detachable base and is provided with an inclined or curved lug 18, which enters an inclined socket or opening 19 of the base and forms a hinge connection which is detachable only when the fastening at the opposite end of the plate is disengaged. This fastening comprises an integral staple 20, projecting from the base and upward through an opening 21, formed in the plate, which latter is secured, preferably, by a tapering pin or a padlock engaging the staple.

22 represents a plate which is apertured at 23 to expose in a line one number of each disk.

The entire cyclometer mechanism is inclosed by a casing 24, which is detachably secured to the plate 16 and is provided with a glazed sight-opening 26, coinciding with the aperture in plate 22; also, with a hinged spring-closing cover 27, which on being swung back in opposition to the spring gives access to the sight-opening, through which the distance indicated by the register is exposed and may be read.

The operation is as follows: The cyclometer having been detachably connected with its base on the forward or rearward travel of the vehicle, the yoke will be oscillated against the action of its centering spring, and through the double-acting cam a corresponding movement will be transmitted to the spring-retracted pawl-carrying arm, causing the pawl to advance the ratchet, which in turn actuates the worm-gearing, and through the cam in part therewith the feed-pawl is caused to periodically advance the ratchet of the first or right-hand wheel of the series. From this wheel motion is imparted at regulated intervals through the transfer-gearing to the next wheels of higher order to indicate addition, as previously stated. These register-wheels are limited to rotate in only one direction by the locking-pawl engaging the ratchet of the first disk of the series.

It will be understood that I do not wish to limit myself to the exact construction and relation of parts as herein illustrated and described, as various changes might be made in the details of the general arrangement or mechanical equivalents might be substituted for one or more parts here employed, and in adapting such equivalents for use in connection with the present mechanism more or less rearrangement or construction may be required, or the positions of the cyclometer and cam might be reversed; but I consider all such changes as immaterial modifications and entirely within the scope of my invention.

Having therefore described the invention, I claim—

1. In a vehicle, the combination of a wheel thereof, a cam upon the hub of the wheel, a cyclometer mounted in fixed relation to the wheel, and a cyclometer-actuating yoke partially encircling the hub in line with the cam and engaging said cam with its inner sides only and having a limited movement in oscillation whereby said yoke is oscillated by the cam in either direction of rotation of the hub.

2. In a vehicle, the combination of a wheel thereof, a cam upon the hub of the wheel, a cyclometer mounted in fixed relation to the wheel, and a self-centering cyclometer-actuating yoke partially encircling the hub in line with the cam and having a limited movement in oscillation whereby said yoke is oscillated by the cam in either direction of rotation of the hub.

3. In a vehicle, the combination of a wheel thereof, a cam upon the hub of the wheel, a cyclometer mounted in fixed relation to the wheel, and a cyclometer-actuating yoke partially encircling the hub in line with the cam and having a limited movement in oscillation whereby said yoke is oscillated by the cam in either direction of rotation of the hub, a shaft carrying said yoke and partially rotated thereby, a cam on said shaft, a pivoted lever having a part engaged by said cam and provided with a pawl at its free end, a ratchet rotatably mounted in engagement with said pawl and adapted to be rotated step by step with each movement of the pivoted arm, a registering mechanism and means extending between the ratchet-shaft and said mechanism for periodically transmitting movement to latter.

4. In a cyclometer, the combination with a registering-train of a ratchet for imparting movement thereto, an intermittently-operated rocker-arm operatively connected with the ratchet, a cam engaging the rocker-arm to retract and periodically release the same to actuate the ratchet and registering mechanism and means for imparting oscillatory movement to the cam.

5. In a vehicle, the combination with a wheel thereof of a cyclometer comprising a registering-train, a ratchet for imparting movement thereto, an intermittently-operated spring-actuated rocker-arm operatively connected with the ratchet, a cam rotatably mounted with respect to and engaging the rocker-arm, and means operated by the vehicle for rotating the cam during the movement of the vehicle whereby the rocker-arm is gradually forced backward against its spring until released by the cam to actuate the ratchet and registering mechanism.

6. In a cyclometer, the combination of the cam-shaft, means for imparting a partial rotation thereto, cam $13^k$ carried thereby, a pivoted arm provided with a pawl at its free end having a projection engaged by the cam and adapted to be raised and lowered thereby, a worm-pinion, shaft therefor and ratchet upon said shaft and engaging the pawl at the free end of the pivoted arm, a shaft carrying a registering-train, a worm-gear engaging the worm-pinion and rotatably mounted on said shaft and actuating a cam also rotatable upon said shaft, a ratchet operatively connected with the first member of the registering-train, a spring-actuated rocker-arm operatively connected with the ratchet and having a part in the path of the cam, whereby the rocker-arm is gradually retracted during rotation of the cam and acts when released thereby to periodically impart rotary movement to the ratchet to operate the registering mechanism.

Signed by me at New York, N. Y., this 24th day of February, 1900.

JAMES A. KEYES.

Witnesses:
W. V. BREMER,
FRANKLAND JANNUS.